United States Patent
Branch Freeman et al.

(10) Patent No.: US 7,231,631 B1
(45) Date of Patent: Jun. 12, 2007

(54) GENERATED CODE FROM GRAPHICAL USER INTERFACE

(75) Inventors: Mary Ann Branch Freeman, Framingham, MA (US); Thomas Paul Lane, Carlisle, MA (US)

(73) Assignee: The MathWorks, Inc., Natick, MA (US)

( * ) Notice: Subject to any disclaimer, the term of this patent is extended or adjusted under 35 U.S.C. 154(b) by 584 days.

(21) Appl. No.: 10/198,510

(22) Filed: Jul. 17, 2002

(51) Int. Cl.
*G06F 9/44* (2006.01)

(52) U.S. Cl. .............. 717/108; 717/106; 717/109; 717/114; 717/116

(58) Field of Classification Search ........ 715/500–733; 709/310, 210; 345/764; 717/106–137
See application file for complete search history.

(56) References Cited

U.S. PATENT DOCUMENTS

| | | | |
|---|---|---|---|
| 5,860,008 A * | 1/1999 | Bradley .................. 717/137 |
| 6,216,138 B1 | 4/2001 | Wells et al. ............... 715/502 |
| 6,862,711 B1 * | 3/2005 | Bahrs et al. ............... 715/526 |
| 2003/0163779 A1 * | 8/2003 | Warren ..................... 715/500 |
| 2003/0164857 A1 * | 9/2003 | Warren ..................... 345/764 |
| 2003/0204637 A1 * | 10/2003 | Chong ..................... 709/310 |
| 2004/0064789 A1 * | 4/2004 | Krausz et al. ............. 715/513 |
| 2005/0066280 A1 * | 3/2005 | Austin et al. ............. 715/733 |

* cited by examiner

*Primary Examiner*—Meng-Al T. An
*Assistant Examiner*—Mark P. Francis
(74) *Attorney, Agent, or Firm*—Lahive & Cockfield, LLP

(57) ABSTRACT

A method and graphical user interface (GUI) are provided. The method includes generating a file of executable code in a dynamically typed programming language that regenerates computations and results of a graphical user interface (GUI). The GUI includes a data GUI for importing data, viewing data, generating data and generating exclusion sets for data, a fitting GUI for fitting models to data, a plotting GUI for controlling the plotting of data and fitted models, and a display window for previewing a plot.

21 Claims, 9 Drawing Sheets

| | Index | X | Y | Weights |
|---|---|---|---|---|
| | 104 | 2985.82547 | 582650.89832 | |
| | 105 | 2980.72241 | 705788.39469 | |
| | 106 | 2975.61784 | 893923.44307 | |
| | 107 | 2970.51177 | 1.08468e+06 | |
| | 108 | 2965.40419 | 1.24757e+06 | |
| | 109 | 2960.29511 | 1.42881e+05 | |
| | 110 | 2955.18452 | 1.60048e+06 | |
| | 111 | 2950.07242 | 1.66866e+06 | |
| | 112 | 2944.95881 | 1.55001e+06 | |
| | 113 | 2939.84369 | 1.22966e+06 | |
| | 114 | 2934.72706 | 863881.38436 | |
| | 115 | 2929.60892 | 569594.23617 | |
| | 116 | 2924.48926 | 376610.64672 | |
| | 117 | 2919.3681 | 291987.9291 | |
| | 118 | 2914.24542 | 249905.63157 | |
| | 119 | 2909.12123 | 226737.59278 | |
| | 120 | 2903.99552 | 200438.71094 | |
| | 121 | 2898.8683 | 196041.17048 | |
| | 122 | 2893.73956 | 186424.59584 | |
| | 123 | 2888.60931 | 173099.82362 | |
| | 124 | 2883.47754 | 157738.27277 | |

Data Sets | View | Exclude and Section | Smooth

Data Sets:

yvs.x

X:x
Y:y
Weight (none)

Excluded sets:
max y values

Close   Help

GENERATED CODE FROM GRAPHICAL USER INTERFACE

TECHNICAL FIELD

This invention relates to generated code from a graphical user interface (GUI).

BACKGROUND

Software that is written for a technical computing environment, such as MATLAB® from The Mathworks of Natick, Mass., may have a graphical user interface (GUI) as well as a command line interface. The GUI allows the user to interact with the software without knowing the commands of the command line interface. The user might provide input to the GUI such as data. Additionally, the user will make a series of choices by interacting with the GUI by pressing buttons, selecting from pull down menus, clicking on checkboxes, typing in text boxes, etc. Based on these selections, the GUI might apply some algorithms to the data and display some results based on these computations. For example, these results might be in the form of a plot or graph, or could also be text results possibly in a table.

SUMMARY

In an aspect, the invention features a method including generating a file of executable code in a dynamically typed programming language that regenerates computations and results of a graphical user interface (GUI).

One or more of the following may be included. Generating the file of executable code may include receiving input from a user through the GUI, storing the input in a plurality of data structures, and generating code from the stored input. Generating code may include receiving a file specification representing a name and location of the file from the user, generating string arrays to hold blocks of code, writing setup code for the results looping through each of the data structures that represent an element of the results, and writing the string arrays of code to the file.

Looping may include examining the data structure for each element to extract details needed to generate code to compute a result, and generate code for each element to compute and plot the result. Looping may include examining the data structure for each element to extract details needed to generate code to compute a result, and generate code to generate text in a display format.

In another aspect, the invention features a method of generating executable code from a graphical user interface (GUI) including opening the GUI, receiving user inputs representing data, processing, fitting and plotting information, storing the user input in data structures, and generating dynamically typed programming language code from the data structures.

One or more of the following may be included. The data structures may include objects in a data set database, objects in a fit database, objects in an exclusion database, and objects in a graph of a result. Each of the objects includes pointers to other objects. Each of the objects may also include a name and user provided data.

In another aspect, the invention features a graphical user interface (GUI) for dynamically typed programming language code including a data GUI for importing data, viewing data, generating data and generating exclusion sets for data, a fitting GUI for fitting models to data, a plotting GUI for controlling the plotting of data and fitted models, and a display window for previewing a plot.

The invention may include one or more of the following advantages.

The method provides a way to use a graphical user interface (GUI) and generate runnable code from the GUI that recreates the results of the GUI. This generated code can be run from a command line interface without opening or using the GUI. This allows a user to pass the same data set, or any other data set with appropriate characteristics, to the generated code and get the desired results. The user can write a loop that calls this code and processes many sets of data. Or the user can incorporate this generated code into other code they have written.

The method provides a user the ability to use a GUI as way to work interactively in a graphical environment to generate command line code.

The method provides a user the ability to visualize a connection between selections made in a GUI and a command line interface via the code generated.

The method provides a user the ability to recreate results later when the code is run on the same data sets.

The method provides a user the ability to apply the same criteria to analyze many sets of similar data.

The method generates a file of code in a dynamically typed language that can recreate all the necessary computations and generate the results of a GUI. The code can then run without opening or running the GUI. The file of code may be run on the original data or any other data set of appropriate characteristics, i.e., any data set that would not cause the generated code to error because of wrong size, and so forth.

Other features, objects, and advantages of the invention will be apparent from the description and drawings, and from the claims.

DESCRIPTION OF DRAWINGS

FIG. 7 is a block diagram of a data GUI.

DETAILED DESCRIPTION

Figure 1:
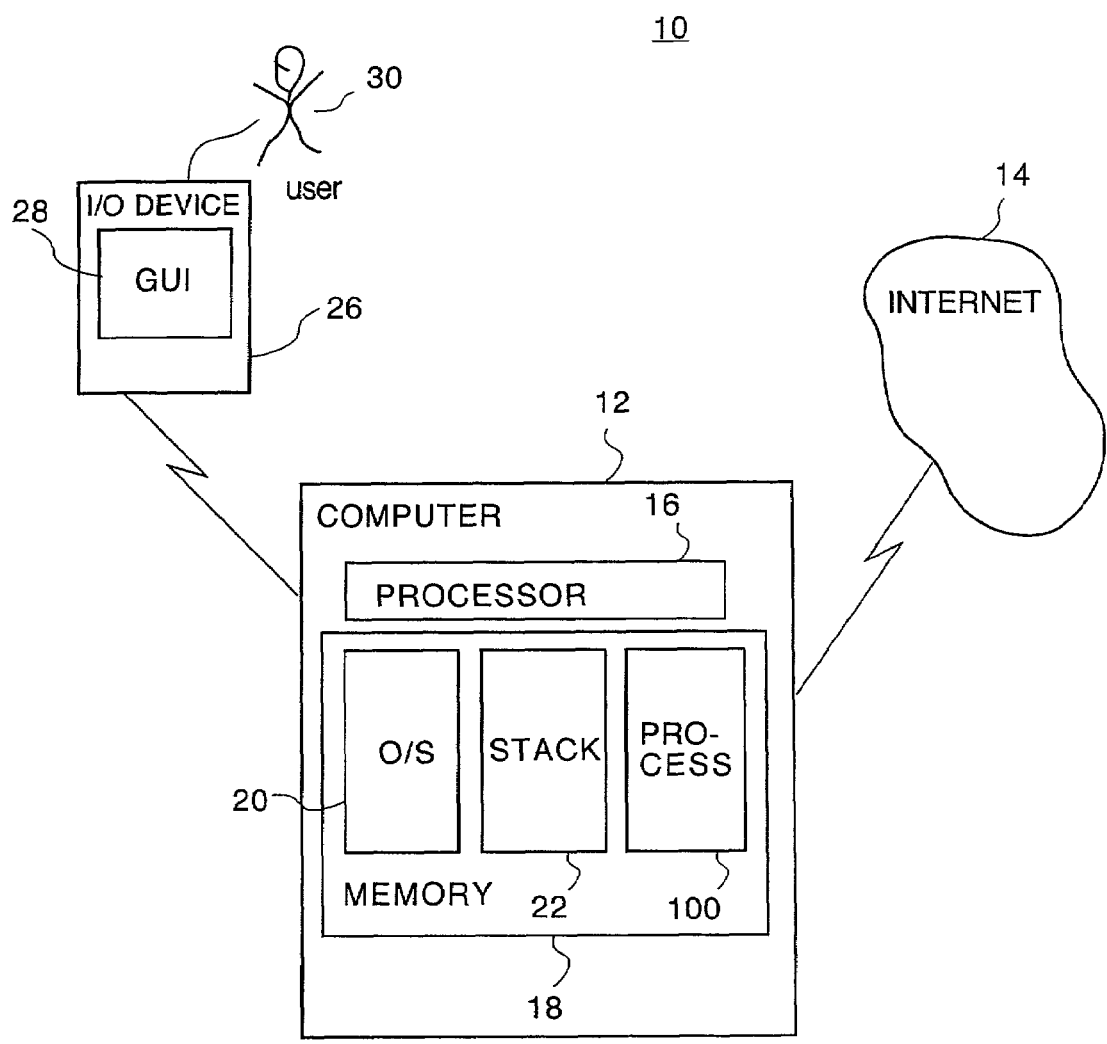
FIG. 1 is a block diagram of a system.

Referring to FIG. 1, a system 10 includes a computer 12, such as a personal computer (PC). Computer 12 may be connected to a network 14, such as the Internet, that runs TCP/IP (Transmission Control Protocol/Internet Protocol) or another suitable protocol. Connections may be via Ethernet, wireless link, or telephone line. Computer 12 contains a processor 16 and a memory 18. Memory 18 stores an operating system ("OS") 20 such as Windows98® or Linux, a TCP/IP protocol stack 22 for communicating over network 14, and machine-executable instructions executed by processor 16 to perform a graphical user interface (GUI) code generation process 100 below. Computer 12 also includes an input/output (I/O) device 26 for display of a graphical user interface (GUI) 28 to a user 10.

As described below, process 100 provides a way to use the GUI 28 interface and generate runnable code from the GUI 28 that re-generates results of the GUI 28. The generated code can be run from a command line interface (not shown) without opening or using the GUI 28. This allows the user 30 to pass the same data set, or any other data set with appropriate characteristics, to the generated code and get desired results. In particular, the user 30 may write a loop that calls the code and processes multiple sets of data. The user 30 can incorporate this generated code into other code they have written. Process 100 allows the user to use the GUI 28 as a way to work interactively in a graphical environment to generate command line code.

By way of example, the process 100 is described in a context of a technical computing environment referred as MATLAB from The Mathworks, Inc. of Natick, Mass., incorporated herein by reference. However, process 100 may be used in conjunction with any dynamically typed programming language. In any programming language a variable's type denotes what kind of values it contains. Example variable types are integer, floating point, and text string. When a variable is static, it means the type is fixed or bound at compile time, and cannot thereafter be changed. When a variable is dynamic, it means that the type is not fixed or bound until run time, and therefore can change repeatedly during the course of program execution. Thus, dynamic typing refers to the property that a variable can adopt a type and change that type according to run-time demands. Process 100 runs in and generates code in a dynamically typed language. Some languages, for example, C++, are "statically typed." In such languages, the types of expressions are fixed by the text of the program. We mention statically typed languages only to differentiate them from the domain of applicability of process 100. Other languages, for example, the MATLAB language, are "dynamically typed." In these languages, the types of expressions need not be fixed by the text of the program.

Figure 2:
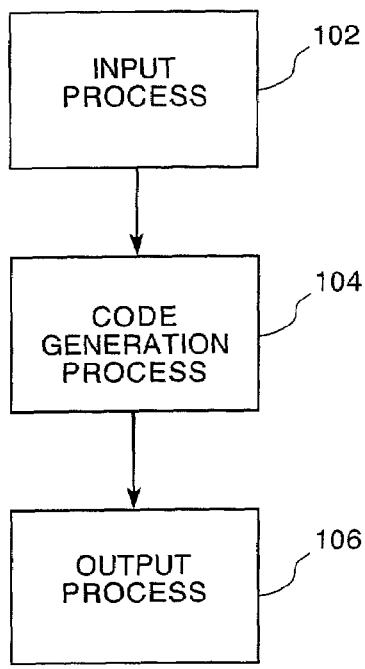
FIG. 2 is a flow diagram of a graphical user interface code generation process.

Referring to FIG. 2, the process 100 includes an input process 102, a code generation process 104 and an output process 106.

Figure 3:
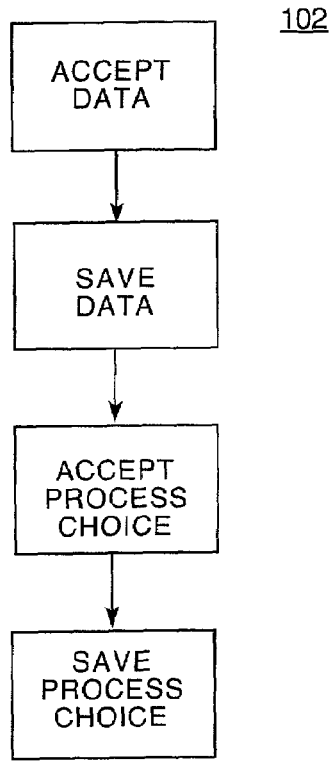
FIG. 3 is a flow diagram of the input process of FIG. 2.

Referring to FIG. 3, the input process 102 includes accepting (200) data through the GUI 28 from the user 30. The process 102 saves (202) the data in a data structure in memory 18. The process 102 accepts (204) processing choices through the GUI 28 from the user 30 and saves (206) the processing choices in the data structure. Thus, at any given time during the input process 200 a state of results of the GUI 28 is maintained in the data structure.

Once the results of the GUI 28 are what the user 30 desires, the user may request that code be generated by the code generation process 104.

Figure 4:
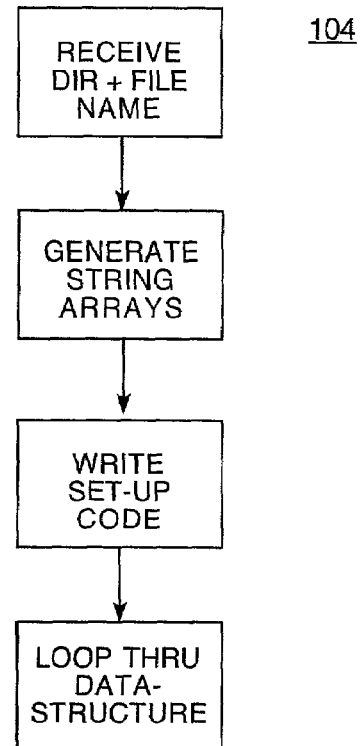
FIG. 4 is a flow diagram of the code generation process of FIG. 2.

Referring to FIG. 4, the code generation process 104 includes receiving (300) a directory and filename where the user 30 wants to save the code. The process 104 generates (302) sting arrays to hold different blocks of code and writes (304) setup code for the results. The process 104 loops (306) through each data structure that represents an element of the results and for each element, examines (308) the data structure to extract details needed to generate code to compute the result and generates (310) code to plot the result (or code to generate text in needed format if the result is text instead of a plot). The process 104 writes (312) the string arrays of code to the file. In another example, writing the string arrays of code to the file is done as the code is generated.

By way of example, MATLAB includes a tool referred to as "cftool." cftool refers to a curve fitting tool that outputs a graph of a curve fitted to data and processing specified by the user. cftool uses databases of objects as the data structures. Each element of an output graph has an object that describes its properties. These objects may depend (i.e., have pointers to) other objects that do not appear directly in the output. cftool includes two main types of objects, Data sets and Fits (fitted models). cftool also has Exclusion sets that are needed for the Fits computation. Thus, cftool provides a central access point for the functions needed to perform applications that involve curve fitting. The functionality in cftool is available through an intuitive visual interface or a command line. cftool functions are implemented in MATLAB, which gives the user access to source code that allows the user to learn from and customize existing algorithms or develop personal algorithms.

Referring back to FIG. 2, the output process 106 generates a graph or text from the input data, processing and generated code.

As described above, once the results of the GUI 28 are what the user 30 desires, the user may request that code be generated by the code generation process 104. By way of example, cftool uses a Save M to File process 400.

Figure 5:
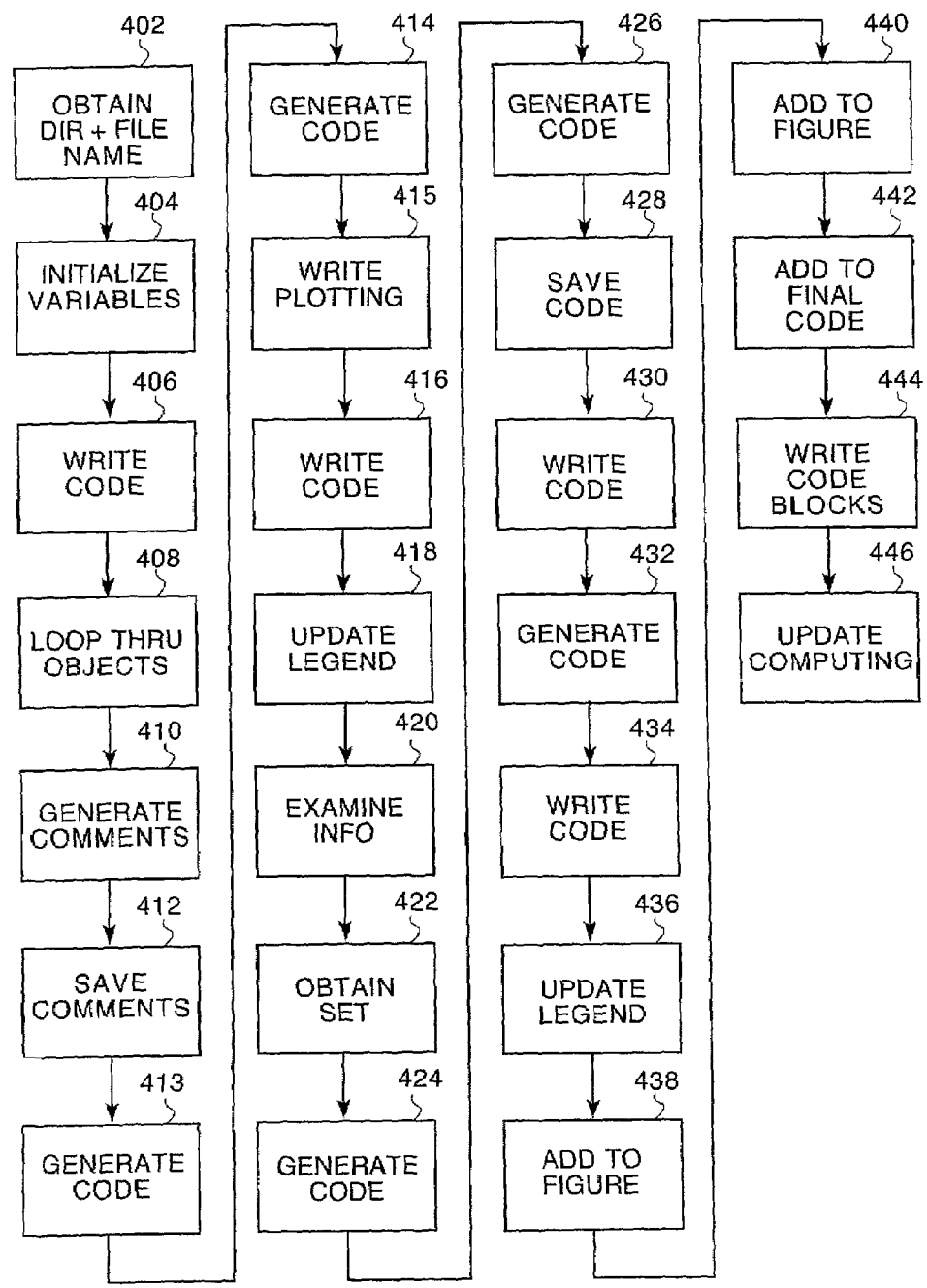
FIG. 5 is a flow diagram of a save M to file process.

Referring to FIG. 5, the Save M to File process 400 utilized in cftool of MATLAB includes obtaining (402) a directory and filename where the user wants to save the code and initializing (404) variables needed in the code. The process 400 generates string arrays to hold different blocks of code that make up a final file of code (these are initially empty). These blocks include a comment block, a setup (of graph) block, a data computation block, a fit computation block, and an end block. The process 400 writes (406) code to the setup block to set up the graph format and loops (408) loop through each object.

For each data set, the process 400 generates (410) descriptive comments about each data set and saves (412) comments to the data block. If the data set comes from a computation (e.g., smoothing), the process 400 generates (413) code to compute the data based on the information stored in the data object. The process 400 generates (414) code to assign variables the values of the input parameters from the function and writes (415) plotting of data code. The process uses a pointer to the actual plot in the graph to get all properties needed to replicate the plot. If data was input or computed, but not in the current plot, the process 400 writes (416) code wrapped in "if 0" so the user can easily remove the "if 0" code and include the plot in the graph. The process 400 updates (418) legend information for the graph.

For each fit, the process 400 examines (420) information stored in the fit object needed to generate code to compute the fitted model. The process 400 obtains (422) related exclusion set object information and generates (424) code to compute the needed exclusion sets for this fit. The process 400 generates (426) code to fit the model and saves (428) the code to the fit block. The process 400 writes (430) code to assign variables with the computed coefficients' values wrapped in "if 0" if the user wants to use the model fitted to the original data and generates (432) code to plot the fits that are currently plotted including each property of line plotted including prediction bounds. If residuals are plotted, the process 400 writes (434) code to compute and plot residuals including each property of residual lines. The process 400 updates (436) legend information.

If not plotted, process 400 adds a comment to the fit computation block that the fit and residuals are not plotted. The process 400 adds (438) to figure setup code to have second axes if residuals exist, adds (440) to figure setup code to compute axis limits and adds (442) to final code to add legend(s) to the plot(s).

The process 400 writes (444) the code blocks to the file. This includes writing the function line header including comments, the comment block of code, the setup of figure block of code, the data related block of code, and the fit related block of code and the end block of code. The process 400 terminates by updating (446) the technical computing environment that a file has been added to a directory.

As mentioned above, the process 100 uses a data structure. A main data structure is an aggregation of all the elements that make up the results. In the cftool example an object-oriented system is used to keep track of the results in the GUI 28. Each type of result is represented as a database of objects (i.e., the aggregation is into object databases). There are two main types of results, data sets and fitted models. The data sets are kept track of by objects in a Data Sets database. The fitted models are kept track of by a Fits database. Fits may also need information about Exclusion sets found in an Exclusion Set database. Each of the databases includes objects having pointers to other objects in other databases as well as pointers to objects in the graph.

In cftool, the object databases are used to keep track of the user's input data, each result generated, the necessary user decisions made to generate that particular result including how the computation is done (what methods with what options), and how the results are displayed. Each object has a name, the user provided data, pointers to related objects (like other data or exclusion sets), all details needed to recompute the results, and a pointer to the actual representation in the graph.

Each cftool data set object includes the following properties: name of data set, x data name, y data name, weight data name, information needed to generate data if computed ("smoothed"), and a pointer to a corresponding line in the graph.

Each cftool fit object includes the following properties: name of fit, cfit object, pointer to a data set, exclusion set name, pointer to a line in the graph representing the fit, and a pointer to the line in the graphs representing the residuals.

Each cftool exclusion set object includes the following properties: name, data set name, specific points to exclude, restrictions on x values and restrictions on y values.

To store information about fitted models, the GUI 28 and the command line interface both use cfit objects. cfit objects contain information needed to recompute a fitted model given data and contain the coefficients of a model that were computed for a specific set of data. More specifically, the cfit object includes the following properties: category, type, linear or non-linear, linear terms or model equation, coefficient names, coefficient values, dependent variable names, independent variable names and problem variable names.

Figure 6:
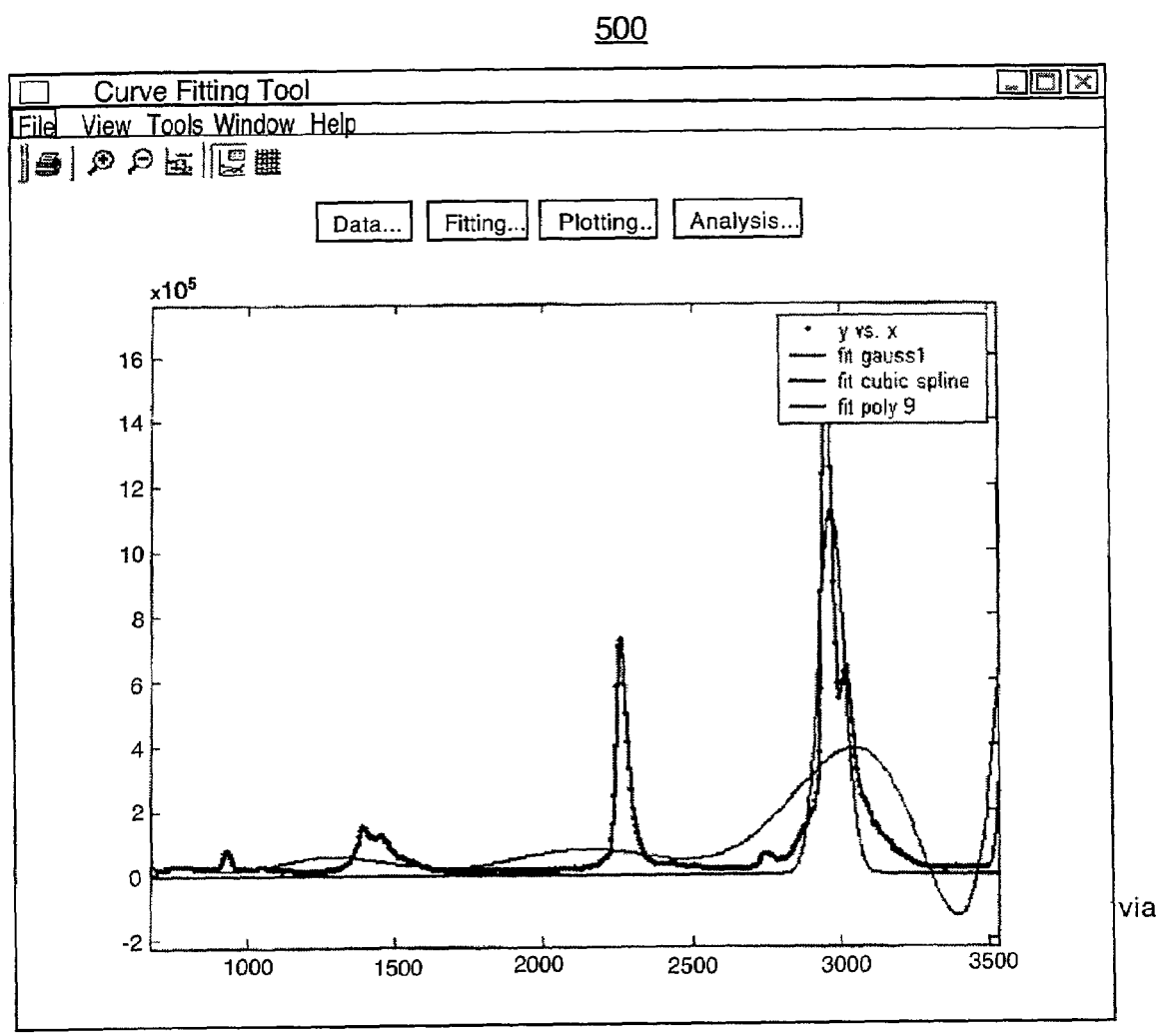
FIG. 6 is a block diagram of a main GUI.
Figure 8:
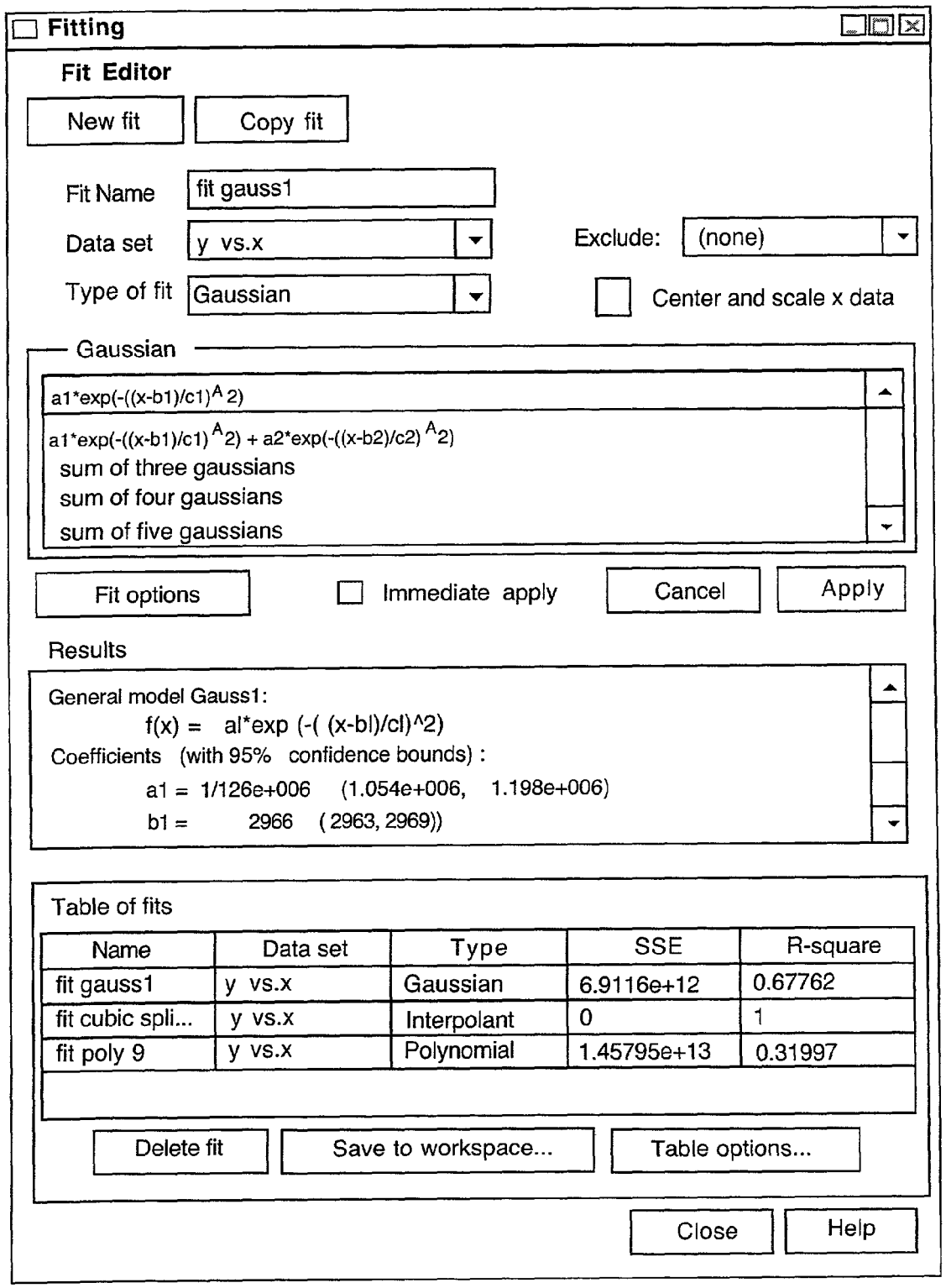
FIG. 8 is a block diagram of a fitting GUI.
Figure 9:
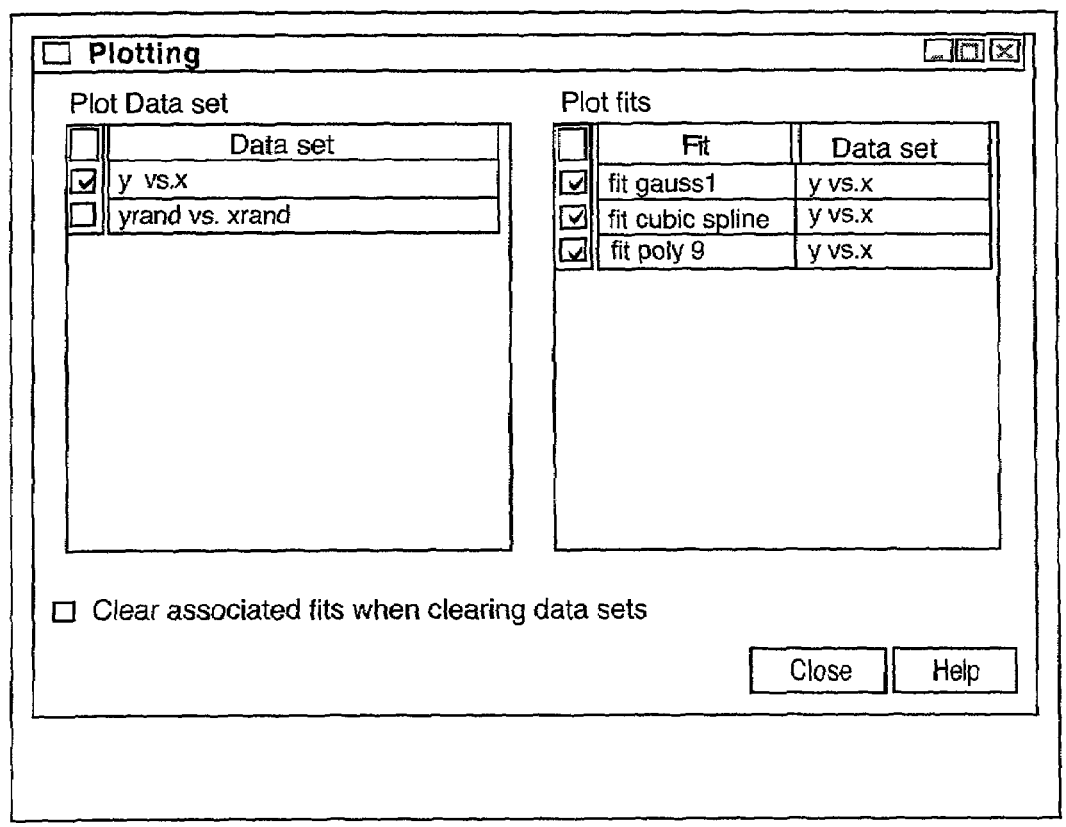
FIG. 9 is a block diagram of a plotting GUI.

Using cftool as an example, the user opens a cftool GUI by typing "cftool" at the command line. The cftool main GUI 500 is shown in FIG. 6. The user interacts with the GUI until all the desired results are generated. The user opens the Data GUI 502, shown in FIG. 7, to import data into cftool, to generate new "smoothed" data, and to create Exclusion sets. A Fitting GUI 504, shown in FIG. 8, is used to fit models to the data sets. A Plotting GUI 506, shown in FIG. 9, is used to select which data and fitted models show in the graph in the main GUI. The user can use the menu items under "View" and "Tools" to adjust the format of the graph (e.g., add a legend or gridlines) and what result information is shown (e.g., residuals or prediction bounds for the fits).

Figure 10:
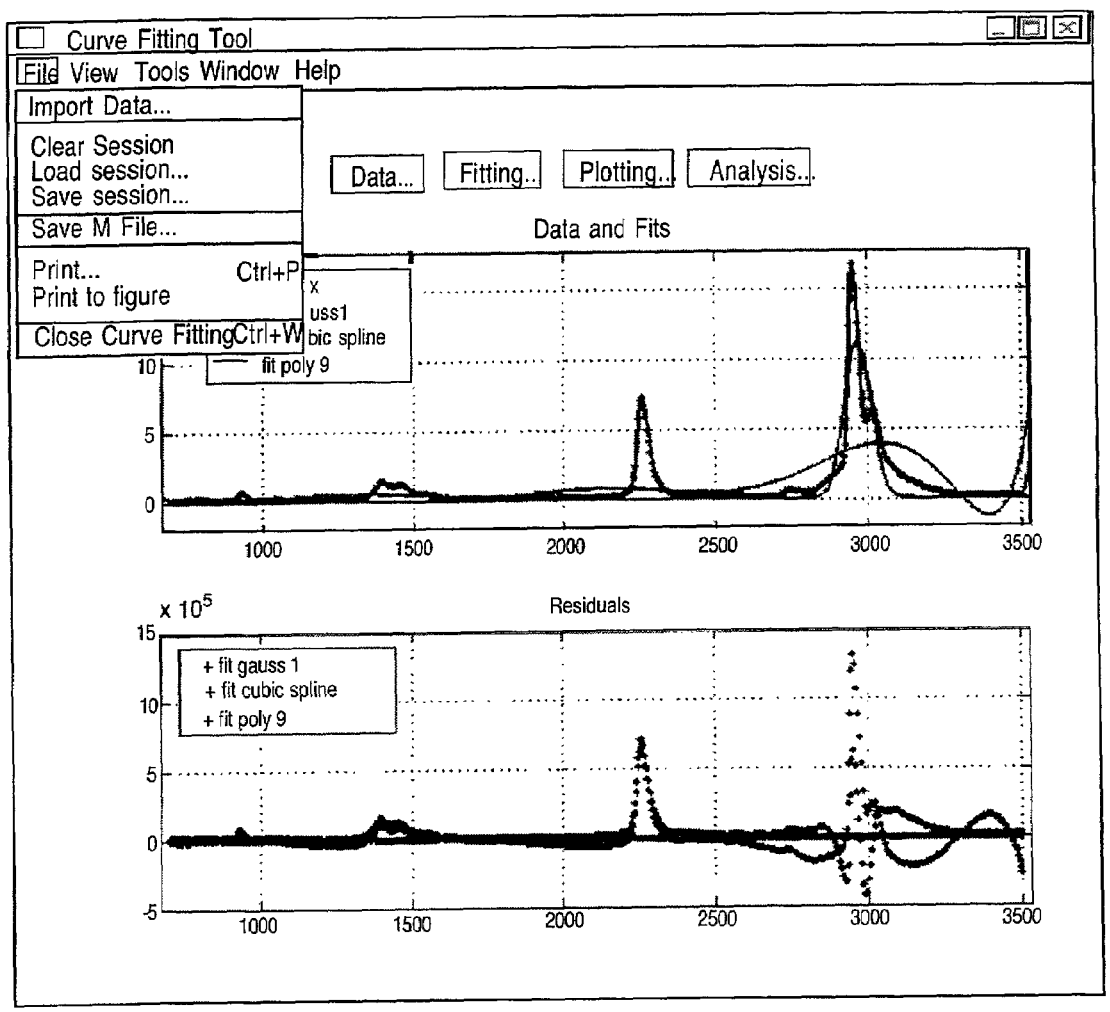
FIG. 10 is a block digram of a main GUI.
Figure 11:
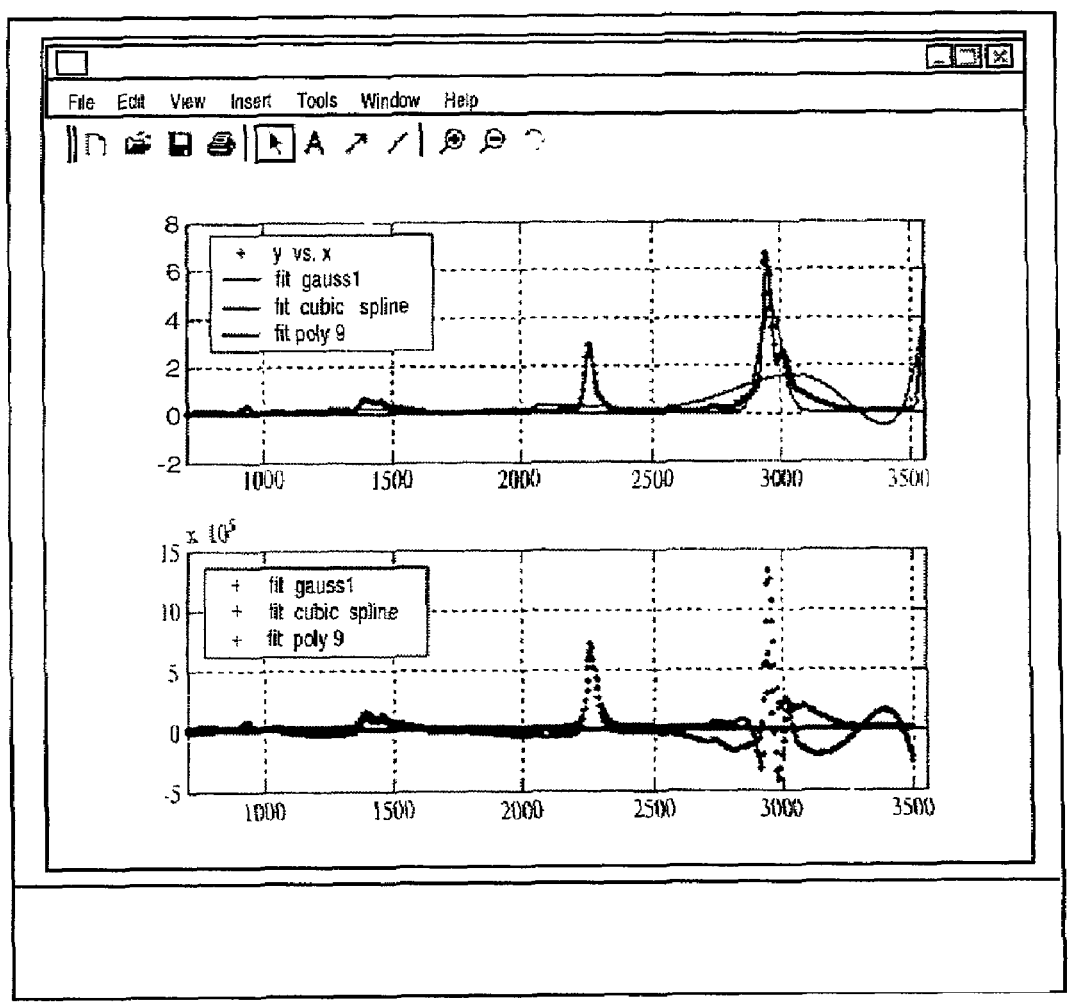
FIG. 11 shows exemplary graphs generated from the code.

The user selects "Save M file" from the File menu of the GUI 510 (of FIG. 10) to generate code. After the user specifies a directory and file name, the code is saved to a file. When called from the command line, the code computes and plots all the results in a MATLAB graph (plotting) window without opening or running the cftool GUI. The code is written as a function and so the user calls it by passing the x and y data vectors for each data set to the function. For example, if the user generates code to the file "fitmydata" and wanted to apply the function to a data set with data "x" and "y", and a dataset with data "xrand" and "yrand", the call is fitmydata (x,y,xrand,yrand). FIG. 11 shows exemplary graphs generated from the code.

Other embodiments are within the scope of the following claims.

What is claimed is:

1. A method of interactively generating code from a graphical user interface, comprising:
   obtaining a graphical user interface (GUI) that enables a user selection of at least one of a plurality of processing choices and further enables a user to enter input data;
   accepting through the GUI at least one user selection of a processing choice from among the plurality of processing choices;
   performing at least one operation using the at least one selection of a processing choice, a result of the at least one operation displayed to a user in the GUI;
   saving the at least one selection of a processing choice, the result of the at least one operation and a format in which the result of the at least one operation was displayed to the user, in a plurality of data structures;
   generating code in a dynamically typed programming language based on the saved at least one selection of a processing choice, the result of the at least one operation and the format in which the result of the at least one operation was displayed to the user, the generated code displayable as source code to the user.

2. The method of claim 1, further comprising:
   executing the generated code from a command line interface.

3. The method of claim 1 in which generating code comprises:
   receiving a file specification representing a name and location of the file from the user;
   generating string arrays to hold blocks of code;
   writing setup code for the result;
   looping through each of the plurality of data structures saving an element of the result; and
   writing the string arrays of code to the file.

4. The method of claim 3 in which looping comprises:
   examining the data structure for each element to extract details needed to generate code to compute a result; and
   generating code for each element to compute and plot the result.

5. The method of claim 3 in which looping comprises:
   examining the data structure for each element to extract details needed to generate code to compute a result; and
   generating code to generate text in a display format.

6. A method of generating executable code from a graphical user interface (GUI):
   opening the GUI;
   receiving user input through the GUI, the user input representing at least one of the group of data, processing, fitting and plotting information;
   performing at least one operation using the received user input in response to a user selection in the GUI, the performance of the operation generating at least one result, the at least one result displayed in a first format to a user;

saving the user input, a record of the user selection, the at least one result and the first format, in data structures; and generating dynamically typed programming language code from the data structures.

7. The method of claim 6 in which the data structures, comprise:
objects in a data set database;
objects in a fit database;
objects in an exclusion database; and
objects in a graph of a result.

8. The method of claim 7 in which each of the objects include pointers to other objects.

9. The method of claim 8 in which each of the objects further includes a name and user provided data.

10. A physical medium holding computer-executable instructions for interactively generating code from a graphical user interface, comprising:
instructions for obtaining a graphical user interface (GUI) that enables a user selection of at least one of a plurality of processing choices and further enables a user to enter input data;
instructions for accepting through the GUI at least one user selection of a processing choice from among the plurality of processing choices
instructions for performing at least one operation using the at least one selection of a processing choice, a result of the at least one operation displayed to a user in the GUI;
instructions for saving the at least one selection of a processing choice, the result of the at least one operation and a format in which the result of the at least one operation was displayed to the user, in a plurality of data structures;
instructions for generating code in a dynamically typed programming language based on the saved at least one selection of a processing choice, the result of the at least one operation and the format in which the result of the at least one operation was displayed to the user, the generated code displayable as source code to the user.

11. A physical medium holding computer-executable instructions for interactively generating code from a graphical user interface, comprising:
instructions for opening a GUI;
instructions for receiving user inputs representing data, processing, fitting and plotting information;
instructions for performing operations using the received input in response to a user selection in the GUI, the performance of the operation generating at least one result, the at least one result displayed in a first format to a user;
instructions for saving the user input, a record of the user selection the at least one result and the first format, in data structures; and
instructions for generating dynamically typed programming language code from the data structures.

12. The method of claim 1, further comprising:
displaying the generated code to a user.

13. The method of claim 1 wherein the generated code uses a type of input as the basis for at least one parameter in a function.

14. The method of claim 1 wherein the generated code replicates upon execution the results of the at least one operation displayed in the GUI.

15. The method of claim 1, comprising further:
receiving a collection of input data with the GUI in addition to the at least one user selection of a processing choice;
performing the at least one operation using the collection of input data; and
generating the code in a dynamically typed programming language based on the collection of input data.

16. The medium of claim 10 wherein the generated code replicates upon execution the results of the at least one operation displayed in the GUI.

17. The medium of claim 10, wherein the instructions further comprise:
instructions for receiving a collection of input data with the GUI in addition to the at least one user selection of a processing choice;
instructions for performing the at least one operation using the collection of input data; and
instructions for generating the code in a dynamically typed programming language based on the collection of input data.

18. The medium of claim 10 in which generating code instructions comprise:
instructions for receiving a file specification representing a name and location of the file from the user;
instructions for generating string arrays to hold blocks of code;
instructions for writing setup code for the result;
instructions for looping through each of the plurality of data structures saving an element of the result; and
instructions for writing the string arrays of code to the file.

19. The medium of claim 18 in which the instructions for looping comprise:
instructions for examining the data structure for each element to extract details needed to generate code to compute a result; and
instructions for generating code for each element to compute and plot the result.

20. The medium of claim 18 in which the instructions for looping comprise:
instructions for examining the data structure for each element to extract details needed to generate code to compute a result; and
instructions for generating code to generate text in a display format.

21. The medium of claim 10 wherein the instructions further comprise:
instructions for executing the generated code from a command line interface.

* * * * *